United States Patent [19]
Karsdon

[11] Patent Number: 6,109,135
[45] Date of Patent: *Aug. 29, 2000

[54] TETRAHELICAL/CURVED BICYCLE CRANK ARM/CONNECTING ROD FOR HUMAN/MECHANICAL POWERED MACHINES AND THE LIKE

[76] Inventor: Jeffrey Karsdon, 200 E. 16th St., Apt. 15H, New York, N.Y. 10003-3722

[*] Notice: This patent is subject to a terminal disclaimer.

[21] Appl. No.: 09/064,346

[22] Filed: Apr. 22, 1998

Related U.S. Application Data

[63] Continuation-in-part of application No. 08/579,339, Dec. 27, 1995, Pat. No. 5,791,202.

[51] Int. Cl.$^7$ ....................................................... F16C 7/02
[52] U.S. Cl. ............................................................. 74/579 E
[58] Field of Search .............................. 74/579 R, 579 E, 74/595, 594.1; D12/123

[56] References Cited

U.S. PATENT DOCUMENTS

| | | |
|---|---|---|
| D. 23,640 | 9/1894 | Grinden . |
| D. 27,778 | 10/1897 | Anderson et al. . |
| D. 32,349 | 3/1900 | Price . |
| D. 365,049 | 12/1995 | Kuylman ................................ D12/123 |
| 626,630 | 6/1899 | Peerstone . |
| 3,221,464 | 12/1965 | Miller ........................................ 52/665 |
| 4,793,208 | 12/1988 | Bregnard et al. ......................... 74/594 |
| 4,807,491 | 2/1989 | Stuckenbrok ............................. 74/594 |
| 4,816,009 | 3/1989 | Philipp ..................................... 474/69 |
| 4,882,945 | 11/1989 | Trevizo ..................................... 74/594 |
| 4,890,588 | 1/1990 | Tillman ................................. 123/78 E |
| 4,957,069 | 9/1990 | Mederer ................................. 123/48 B |
| 4,960,013 | 10/1990 | Sander ...................................... 74/594 |
| 4,966,109 | 10/1990 | Pusic et al. ............................. 123/197 |
| 4,974,554 | 12/1990 | Emery .................................... 123/48 B |
| 5,010,785 | 4/1991 | Romero ..................................... 74/594 |
| 5,020,287 | 6/1991 | Woods . |
| 5,025,757 | 6/1991 | Larsen .................................. 123/48 R |
| 5,060,536 | 10/1991 | Boys ........................................ 74/594 |
| 5,125,288 | 6/1992 | Amiet ..................................... 74/594.1 |
| 5,136,987 | 8/1992 | Schechter et al. ........................ 123/48 |
| 5,157,988 | 10/1992 | Pinkstock ................................. 74/594 |
| 5,178,103 | 1/1993 | Simko ...................................... 123/48 |
| 5,179,873 | 1/1993 | Girvin ...................................... 74/594 |
| 5,186,127 | 2/1993 | Cuatico . |
| 5,199,324 | 4/1993 | Sain ......................................... 74/594 |
| 5,201,287 | 4/1993 | Blish .................................... 123/48 B |
| 5,207,119 | 5/1993 | Garneau ................................. 74/594.3 |
| 5,791,202 | 8/1998 | Karsdon ................................. 74/594.1 |

FOREIGN PATENT DOCUMENTS

| | | |
|---|---|---|
| 843684 | 7/1939 | France . |
| 888628 | 12/1943 | France . |
| 2 063 418 | 6/1981 | United Kingdom . |

*Primary Examiner*—Mary Ann Battista
*Attorney, Agent, or Firm*—Hamilton, Brook, Smith & Reynolds, P.C.

[57] ABSTRACT

A curved, tetrahelix bicycle crank arm composed of a helical array of tetrahedra is disclosed. This design will transmit the propelling force away from the top dead center point providing more efficient use of the propelling energy. With this tetrahelical design a hollow core is possible that will reduce weight and permit lubrication if needed without reducing strength. This design is also applicable to the connecting rod of internal or external combustion engine.

17 Claims, 5 Drawing Sheets

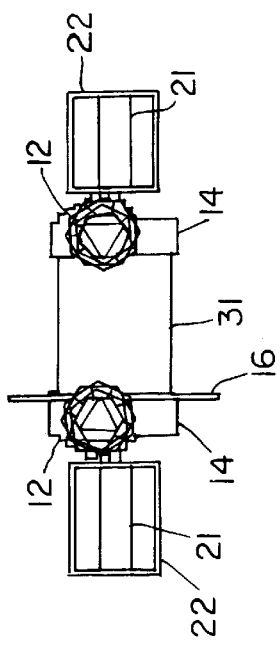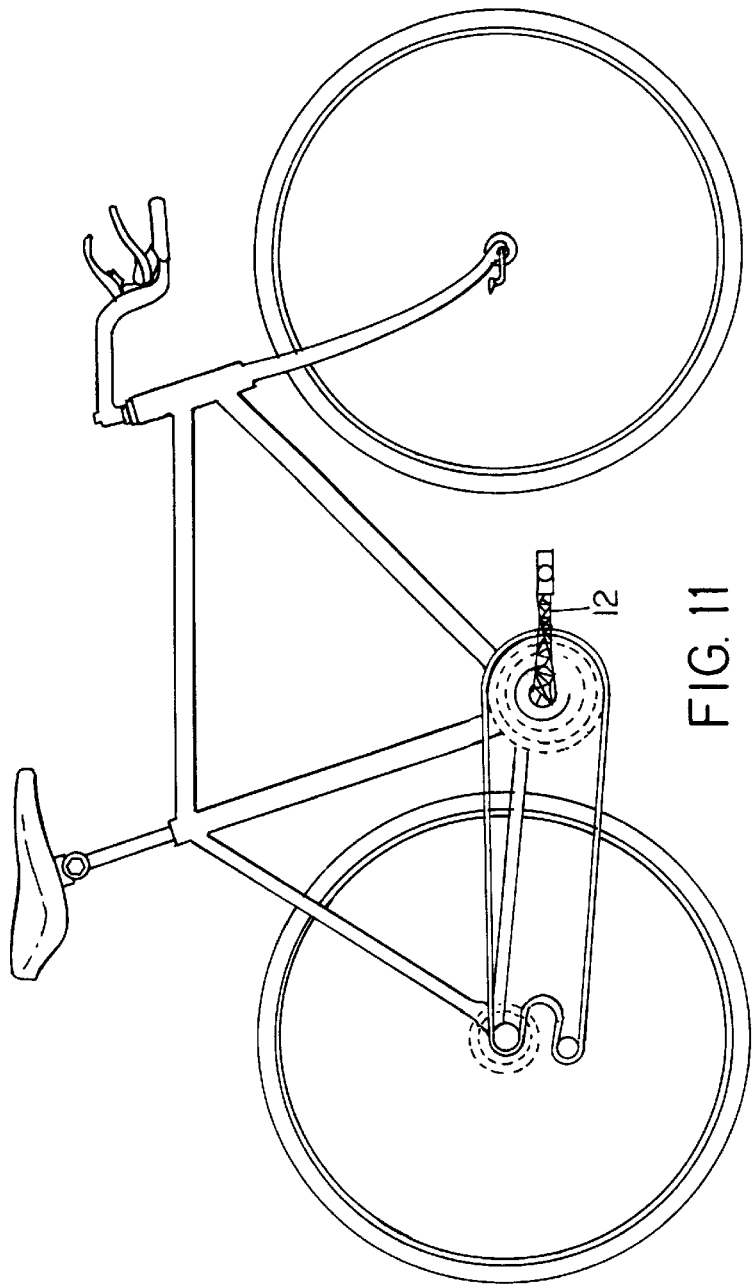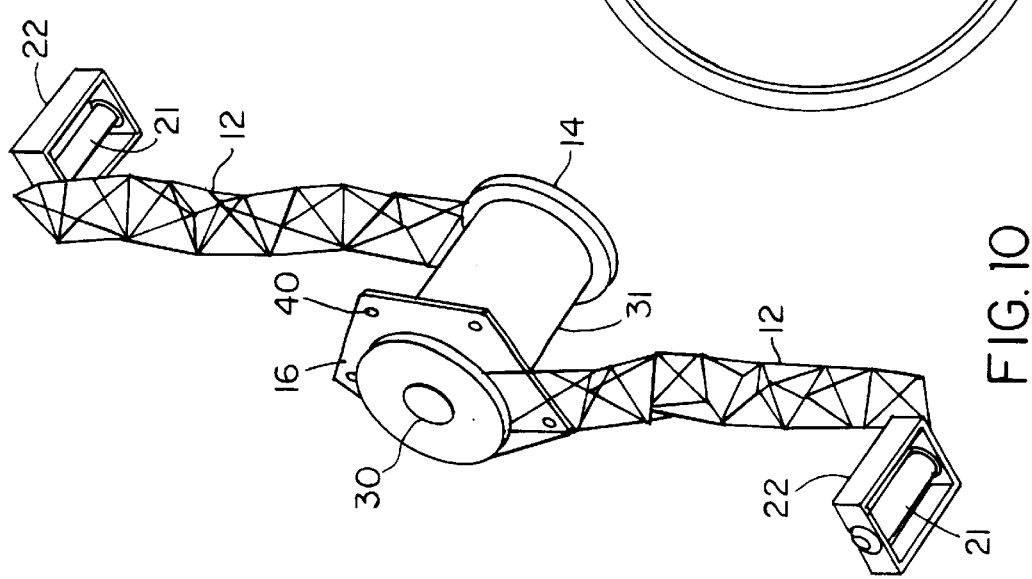
FIG. 9
FIG. 11
FIG. 10

TETRAHELICAL/CURVED BICYCLE CRANK ARM/CONNECTING ROD FOR HUMAN/MECHANICAL POWERED MACHINES AND THE LIKE

RELATED APPLICATIONS

This application is a Continuation-In-Part of U.S. patent application Ser. No. 08/579,339, filed on Dec. 27, 1995, now U.S. Pat. No. 5,791,202, the entire teachings of which are incorporated herein by reference.

TECHNICAL FIELD OF INVENTION

This invention relates to a curved crank or rod to displace drive force from a pedal or cylinder head, for example, away from dead center.

BACKGROUND—DESCRIPTION OF PRIOR ART

Various crank/connecting rod designs are generally well known. Such designs are primarily used in human powered bicycles or non-human powered vehicles with internal or external combustion engines, be it fossil fueled, steam or other propellant, used on land, sea or air. The purpose of such a design is to transmit the force from the power source to the driving mechanism.

Mechanisms have been proposed for more efficient bicycles by displacing the top dead center. Examples of such mechanisms are disclosed in U.S. Pat. No. 4,793,208 [displaces top dead center] to Bregnard et. al. U.S. Pat. No. 4,807,491 to Stuckenbrok, U.S. Pat. No. 4,882,945 to Trevizo (1989), and U.S. Pat. No. 4,960,013 to Sander (1990) disclose systems for mechanically extending and shortening the crank. U.S. Pat. No. 4,816,009 to Philipp (1989) further refined these techniques.

Similar and more recent techniques for increasing the efficiency of the bicycle in particular have been used: U.S. Pat. No. 5,207,119 to Garneau describes a system that varied the length of the pedal arm, the system of U.S. Pat. No. 5,199,324 to Sain rotated the crank arm, U.S. Pat. No. 5,179,873 to Girvin (1993) teaches the use of a hollow crank to reduce crank weight without loss of strength, the crank of U.S. Pat. No. 5,157,988 to Pinkstock (1992) used a spring to store energy, U.S. Pat. No. 5,060,536 to Boys (1991) described the use of a flexible crank arm with a rectangular cross section, U.S. Pat. No. 5,010,785 to Romero (1991) provided for a tubular crank arm, and U.S. Pat. No. 5,125,288 to Amiet (1992) taught the use of an arcuate crank that could be filled with mercury.

In the realm of internal or external combustion engine connecting rods, U.S. Pat. No. 4,890,588 to Tillman described a system that rotated the crank arm/connecting rod a number of degrees past top dead center. U.S. Pat. No. 4,957,069 to Mederer suggested a prolonged connecting rod, U.S. Pat. No. 4,966,109 to Pusic, et al. taught the use of a hydraulic connecting rod for both internal-combustion and steam engines, and U.S. Pat. No. 5,136,987 to Schechter, et al. provided for a hydraulically variable connecting rod to vary length which was improved in U.S. Pat. No. 5,178,103 to Simko. U.S. Pat. No. 5,201,287 to Blish described a system that used an extension rod operated hydraulically, mechanically or electrically to vary stroke length. U.S. Pat. No. 4,974,554 to Emery (1990) taught to raise the piston head at top dead center to increase the mechanical and input/output efficiencies of an engine (internal or external combustion) by providing for an increased effective moment arm offered by the crankshaft rod journal during the period of peak combustion pressure. U.S. Pat. No. 5,025,757 to Larsen provided for pivoting the engine block to change the top dead center distance. U.S. Pat. No. 5,186,127 to Cuatico (1993) used an off-set connecting rod to obtain a better mechanical advantage in the internal combustion engine.

SUMMARY OF THE INVENTION

These prior art devices are suited for one specific purpose, e.g. a bicycle, an internal or an external combustion engine. Moreover, they have complicated designs requiring complicated machine tooling and have complicated construction with many moving parts that are prone to failure and difficult to repair. These aspects, render the prior art devices expensive to construct, maintain, and/or repair.

The present invention is concerned with a force or power transmission assembly for but not limited to bicycles or other crank and/or connecting rod devices. A novel method to transmit power, human or non-human, to a bicycle drive axle of vehicle drive train is disclosed to increase the driving force, such that the driving force is directed away from the top dead center. This maximizes force because when the crank/connecting rod is at the highest point, it displaces this force away from the top dead center point. The advantage of this is that, by displacing the maximal force away from the top dead center point, the force applied to the crank will be at the maximal stroke height thus the driving force is used more efficiently.

The present invention overcomes the disadvantages of the prior art devices, which are suited for only one purpose, have complicated designs, have complicated constructions with multiple parts, and are expensive to construct. This invention is novel for it is adaptable to many applications, it is simple in design, it is simple in construction with no or few moving parts and it is inexpensive to construct.

Accordingly, my invention has a different object and advantages which are:

(a) A design suitable for many applications, i.e. human powered vehicles and/or machines or non-human or mechanical powered vehicles and/or machines.

(b) A design that is simple and basic in nature with great strength.

(c) A design that is simple to construct for it is based on a repetition of a basic structure and has no moving parts.

(d) A design that is inexpensive to construct due to its basic and repetitive nature.

In general according to one aspect, the invention features a power transmission assembly. It comprises a hub, which in specific embodiments is a crankshaft for an engine or axle for a bicycle. A tetrahelical connecting rod is provided that has a proximal end that is attached to the hub. It transmits a driving force between the proximal end and a distal end. In specific embodiments, the connecting rod can be a piston rod or a bicycle crank arm, in two specific examples.

In other specifics, the connecting rod is hollow, permitting lubrication and is constructed from steel, plastic, or reinforced fiber composites. Further, the rod is constructed from plural tetrahedrons that are attached to each other at triangular faces thereof. This forms a helical shape that moves the top dead-center point of the connecting rod relative to a straight arm.

Further objects and advantages are to provide an apparatus and method which can be used easily and conveniently in any vehicle used on land, sea, air and space, i.e. human powered vehicle, e.g. bicycle or non-human/mechanical powered vehicles, e.g. internal/external combustion engine to efficiently transmit the driving force to the drive train by displacing the top and bottom dead center points, which will be light and strong, which will be easy to construct and easy to maintain, and which will have a minimum of moving parts.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention.

In the drawings, closely related figures have the same number but different alphabetic suffixes.

FIG. 9 is a schematic cross sectional top view of the right and left handed tetrahelix cranks.

FIG. 10 is a schematic isometric view of the right and left handed tetrahelix cranks.

FIG. 11 is a schematic view of the tetrahelix crank/ connecting rod on a bicycle.

DETAILED DESCRIPTION OF THE DRAWINGS

Figure 1A:
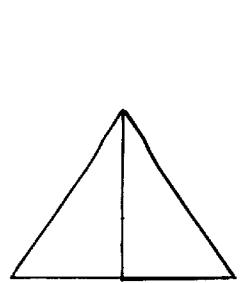
FIG. 1A shows a tetrahedron, frontal view.
Figure 1B:
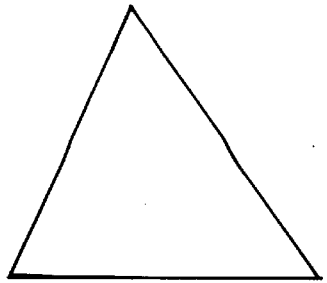
FIG. 1B shows a tetrahedron, side view.
Figure 1C:
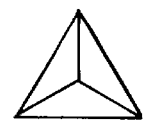
FIG. 1C shows a tetrahedron, top view.
Figure 2A:
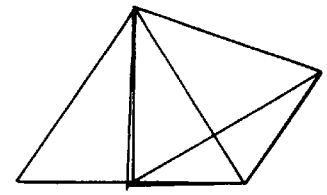
FIG. 2A shows two triple bonded tetrahedra, frontal view.
Figure 2B:
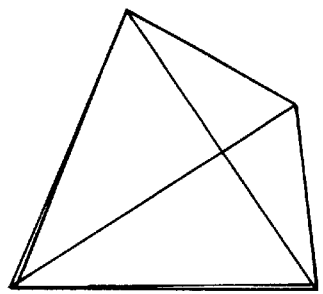
FIG. 2B shows two triple bonded tetrahedra, side view.
Figure 2C:
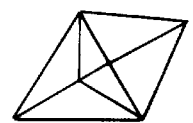
FIG. 2C shows two triple bonded tetrahedra, top view.
Figure 3A:
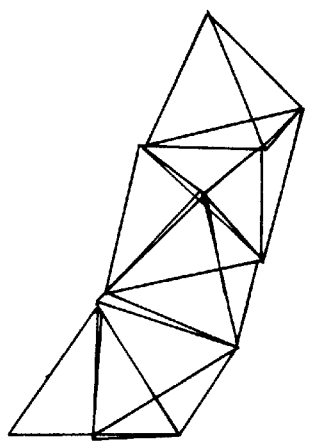
FIG. 3A is a helical array of triple bonded tetrahedra forming a tetrahelix, frontal view.
Figure 3B:
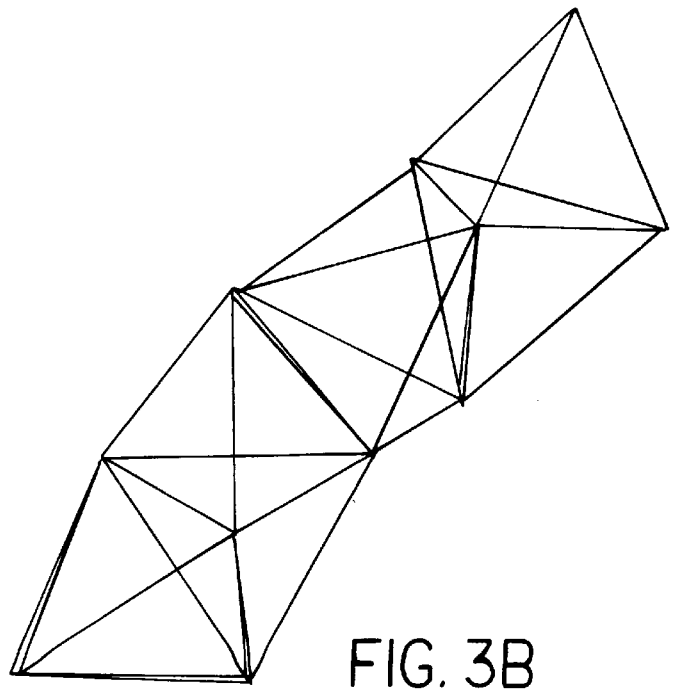
FIG. 3B is a helical array of triple bonded tetrahedra forming a tetrahelix, side view.
Figure 4:
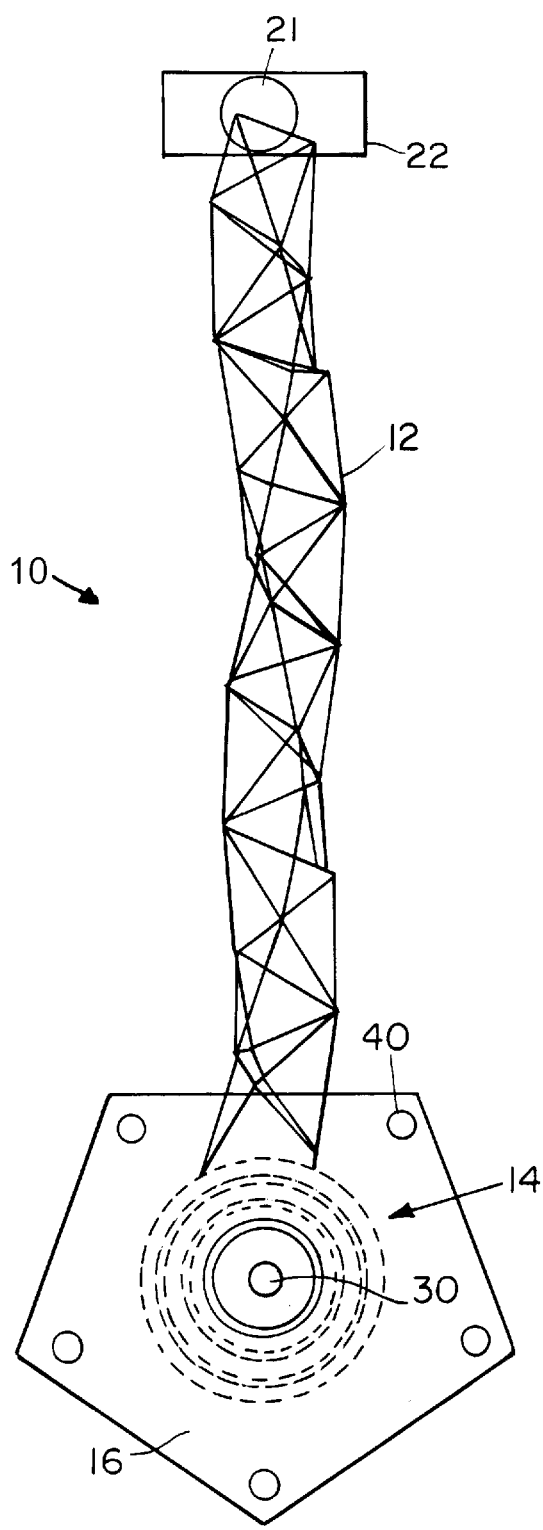
FIG. 4 is a schematic lateral view of the tetrahelix crank illustrating several features of the present invention with an important feature thereof, namely the curved nature of the present invention, the simple design, displacement of the top dead center point.
Figure 5:
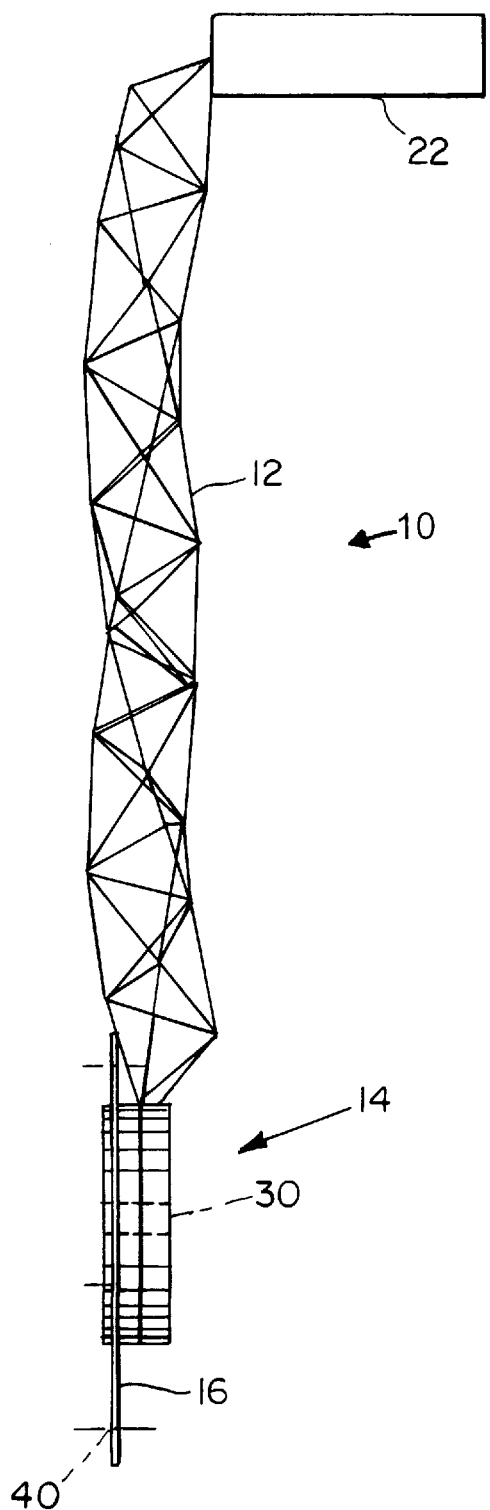
FIG. 5 is a schematic view from the front of the right handed tetrahelix crank.
Figure 6:
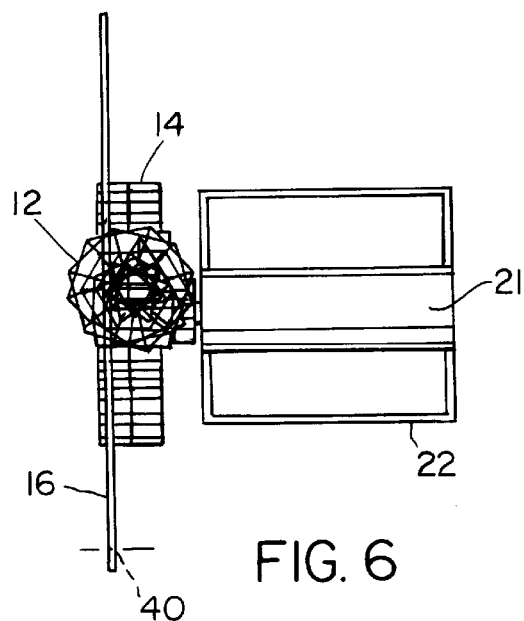
FIG. 6 is a schematic cross sectional top view of the right handed tetrahelix crank illustrating features of the present invention with an important feature thereof, namely the potential for a hollow central core that may permit easy lubrication and weight reduction without loss of strength.

In the drawings, 10 is a tetrahelical bicycle crank arm assembly; 12 is a hollow tetrahelical crank arm or connecting rod; 14 is a cylindrical hub (27 mm outside diameter, standard mounting hole 30); 16 is a flange; 21 is a pedal mounting lug (0.562"×20 thread); 22 is a standard pedal assembly; 30 is a standard mounting hole (disposed axially through its center to accept an end of a standard bottom bracket axle; 31 is a standard bottom bracket axle; and 40 is a mounting hole (for bolting flange to larger chain sprocket (not shown)). 50 is a piston; 51 is an exhaust valve; 52 is a spark plug; 53 is an intake valve; 54 are rings on the piston 50; 55 is the cylinder bore; 56 is the crankshaft; 57 is the engine block surrounding the piston bore and crankcase.

Figure 7:
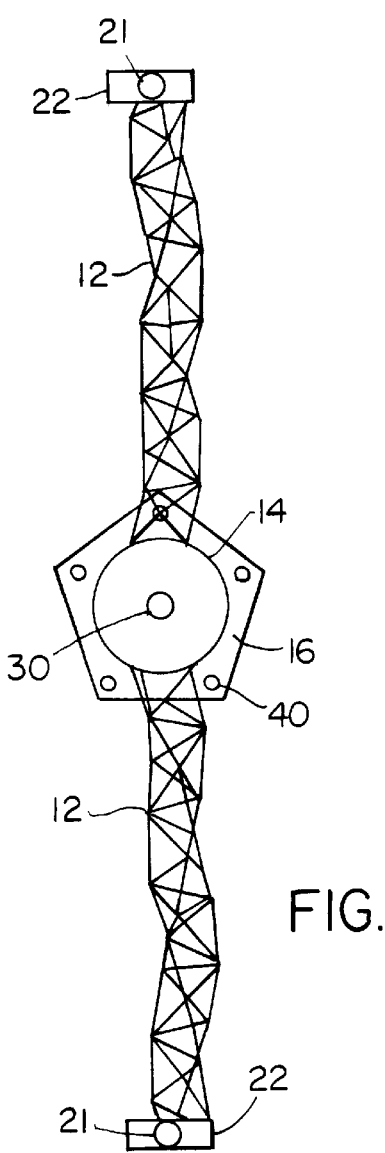
FIG. 7 is a schematic lateral view of the right and left tetrahelix cranks illustrating several features of the present invention with an important feature thereof, namely the curved nature of the present invention, the simple design, displacement of the top/bottom dead center points.
Figure 8:
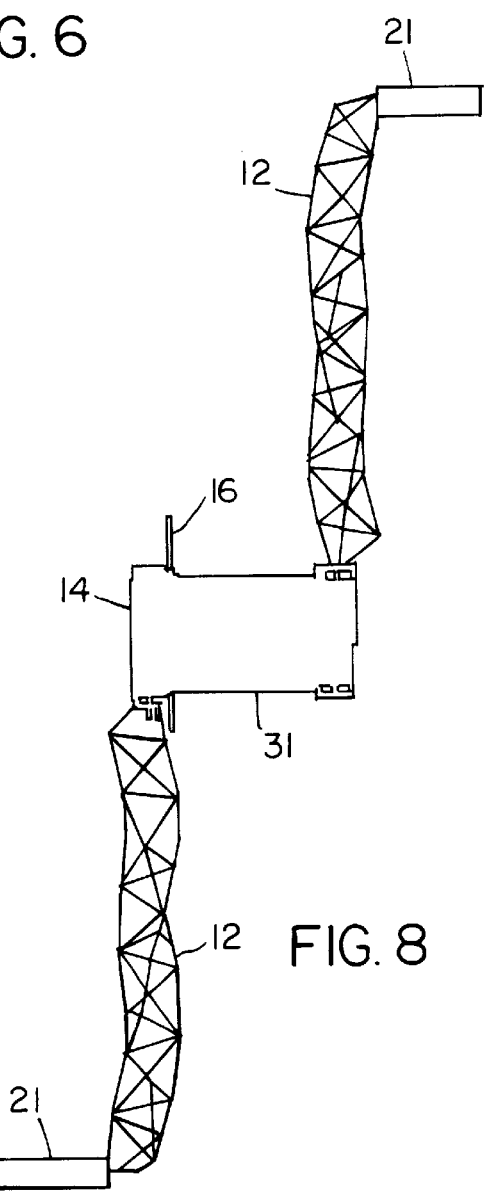
FIG. 8 is a schematic view from the front of both right and left handed tetrahelix cranks.

The schematic view in FIG. 7 shows the tetrahelix or tetrahelical crank with a plurality of helical arrayed tetrahedra of the present invention.

A typical embodiment of the tetrahelix crank assembly 10 shown includes a hollow centered crank arm 12 attached to a cylindrical hub 14. The hub is for mounting onto an axle crankshaft 31. The cylindrical hub 14 is attached to a flange 16 which will transmit the propelling forces to the drive wheel or chain sprocket mounting (not shown). The crank arm/connecting rod fabricated of any suitable material, e.g., steel, plastic or fiber-reinforced composites. The center of the crank/connecting rod is preferably hollow, maintaining strength while reducing weight and permitting lubrication if needed.

The hub 14 is about 27 mm in outside diameter and has a standard mounting hole 30 disposed axially through its center to accept an end of a standard bottom bracket axle 31. The pedal mounting lug 21 has a 0.562"×20 thread and a standard pedal assembly 22.

The depicted tetrahelix crank arm 12 is for use on the right hand side 10 of the bicycle, it has a sprocket mounting flange 16 having a plurality of mounting holes 40. The preferred left hand tetrahelix crank arm assembly of the overall tetrahelical bicycle crank arm assembly 20 is similar to the right hand tetrahelix crank assembly 12 except it has no sprocket mounting flange 16.

The tetrahelix crank arm 12 has a length between opposing hole 30 and the pedal mounting lug 21 centers of 155–185 mm.

Figure 12:
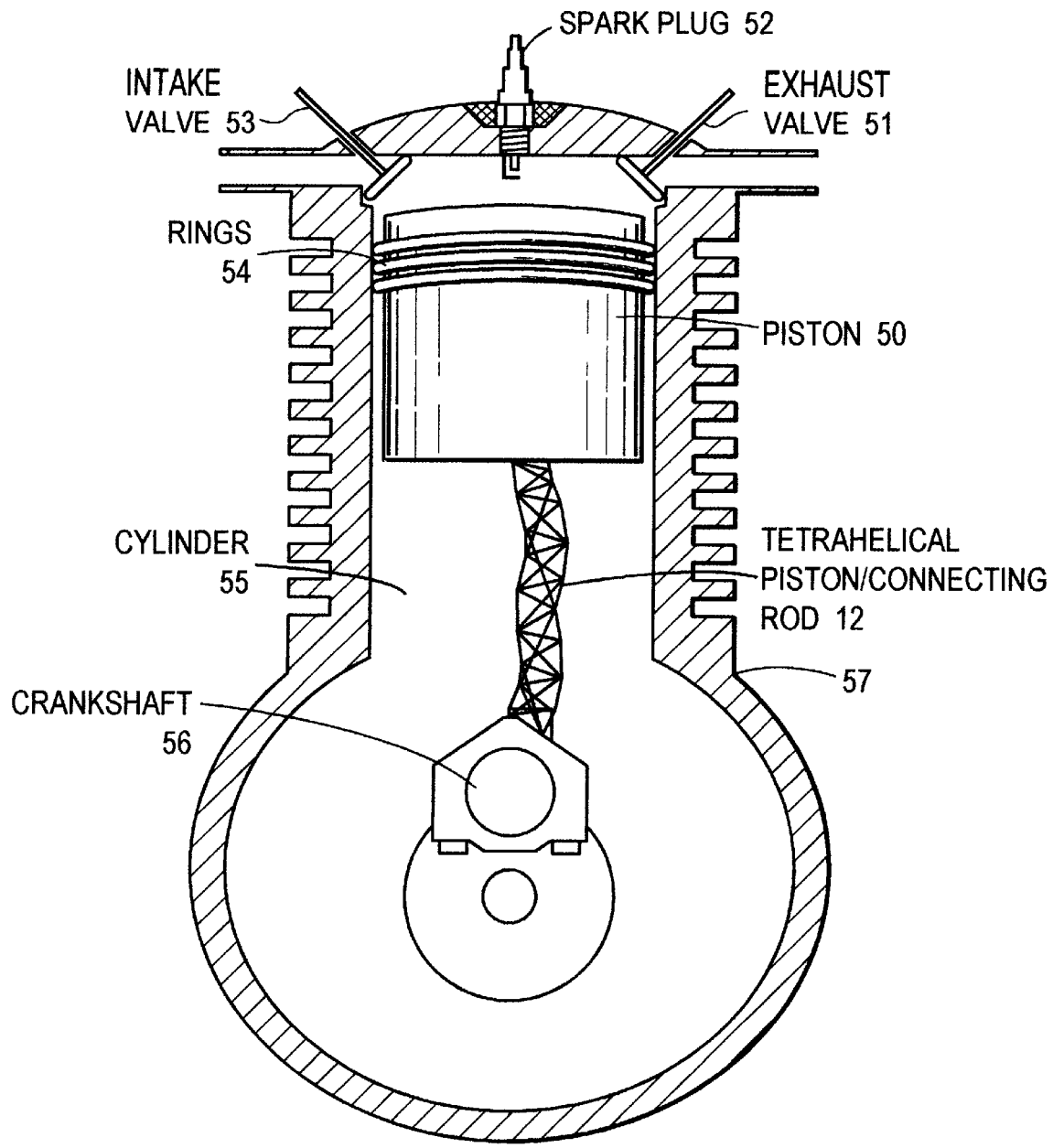
FIG. 12 is a side, partial cut-away, view showing a tetrahelical connecting rod in an internal combustion engine.

FIG. 12 shows another application of the tetrahelical crank arm in a piston connecting rod, see reference 12. Specifically, a piston 50 is contained within a cylinder bore 55. As is conventionally known, a fuel air mixture is received into the cylinder bore 55 through an intake valve 53. It is ignited by a spark plug 52. The combustion process creates a driving force which pushes the piston 50 downward in the illustration of FIG. 12. The curved, helical shape of the tetrahelical piston connecting rod 12 turns the crankshaft or hub 56, thereby turning the drive train of the vehicle, a car for example.

Accordingly, the reader will see that the tetrahelix crank arm/connecting rod of this invention can be used to displace propelling force away from the top and bottom dead points easily and conveniently thus making the most efficient use of the propelling force. Further, the tetrahelix crank arm/ connecting rod has the additional advantages in that it is easy to construct;

it is easy to manufacture;

it permits maximum strength with minimum weight;

it allows for a hollow center to reduce weight without loss of strength;

it allows for a hollow center to provide lubrication when needed;

it allows for any material to be used in its construction and still have maximum strength;

it allows for use in human powered vehicles such as a bicycle as well as in machine driven vehicles either internal or external combustion that can be used on land, sea, air or space.

it allows for use in human powered machines such as a generator, pulley system as well as in machines that can be used on land, sea, air or space.

Although the description above contains many specificities, these should not be construed as limiting the scope of the invention but as merely providing illustrations of some of the presently preferred embodiments of this invention. For example, the tetrahelix crank/connecting rod can be used not only for vehicles but in various sporting equipment or tools to provide the most efficient use of the propelling energy.

While this invention has been particularly shown and described with references to preferred embodiments thereof, it will be understood by those skilled in the art that various changes in form and detail may be made therein without departing from the spirit and scope of the invention as defined by the appended claims.

I claim:

1. A power transmission assembly comprising:
   a) a hub, wherein the hub is a crankshaft;
   b) a tetrahelical connecting rod, having a proximal end that is attached to the hub, for transmitting a driving force between the proximal end and a distal end.

2. The power transmission assembly of claim 1, wherein the connecting rod is constructed from plural polyhedrons.

3. The power transmission assembly of claim 1, wherein the crankshaft is part of an internal combustion engine.

4. The power transmission assembly of claim 1, wherein the crankshaft is part of a bicycle.

5. The power transmission assembly of claim 1, wherein the distal end receives a drive force from a piston.

6. The power transmission assembly of claim 1, wherein the distal end receives a drive force transferred via a pedal.

7. The power transmission assembly of claim 1, wherein the connecting rod is hollow.

8. The power transmission assembly of claim 7, wherein the hollow rod permits lubrication.

9. The power transmission assembly of claim 1, wherein the connecting rod is constructed from one of steel, plastic, or reinforced fiber composite.

10. The power transmission assembly of claim 1 wherein the connecting rod is used in a human or non-human powered vehicle.

11. The power transmission assembly of claim 1 wherein the connecting rod is constructed from plural tetrahedrons.

12. The power transmission assembly of claim 11, wherein the tetrahedrons are bonded to each other.

13. The power transmission assembly of claim 11, wherein the tetrahedrons are bonded to each other at triangular faces thereof.

14. The power transmission assembly of claim 11 wherein the tetrahedrons are bonded together to form a helical shape.

15. The power transmission assembly of claim 14, wherein the helical shape moves the top dead-center point of the connecting rod relative to a straight arm.

16. The power transmission assembly of claim 11, wherein the tetrahedrons are hollow.

17. A power transmission assembly for propelling a bicycle, comprising:
   a) a hub, wherein the hub is a crankshaft;
   b) a tetrahelical connecting rod, having a proximal end that is attached to the hub, for transmitting a driving force between the proximal end and a distal end.

* * * * *